United States Patent [19]

Borbone

[11] Patent Number: 5,582,209
[45] Date of Patent: Dec. 10, 1996

[54] VALVE BLOCK ASSEMBLY FOR I.S. MACHINE

[75] Inventor: Joseph A. Borbone, Paxton, Mass.

[73] Assignee: Emhart Glass Machinery Investments Inc., Wilmington, Del.

[21] Appl. No.: 323,466

[22] Filed: Oct. 14, 1994

Related U.S. Application Data

[63] Continuation-in-part of Ser. No. 47,680, Apr. 15, 1993, abandoned.

[51] Int. Cl.$^6$ .................................................. F16K 11/02
[52] U.S. Cl. ............... 137/884; 137/596.16; 137/596.18
[58] Field of Search ............................. 137/596, 596.16, 137/596.18, 884

[56] References Cited

U.S. PATENT DOCUMENTS 4,348,942  9/1982  Stoll ..................................... 137/884 X
4,415,004  11/1983  Bouteille et al. ....................... 137/884

Primary Examiner—John C. Fox
Attorney, Agent, or Firm—Spencer T. Smith

[57] ABSTRACT

A valve block assembly for supplying air under pressure to an air operated mechanism of a glass container manufacturing machine comprising a valve block body, conduit means defined in the valve block body, a valve for controlling the flow of air under pressure to the conduit means and means for preventing the pressurization of the conduit means including a hole in the valve body block communicating with the conduit means, a sealing plug located within the hole, an axial bore in the sealing plug, an elongated pin slidingly received within the axial bore, one end of the pin being located within the conduit means and the other end of the pin being located outside of the block, a cylindrical member coaxially secured to the one end of the pin a cylindrical control plug having an axial bore through which the pin extends and a cylindrical recess for receiving the cylindrical member, sealing means for preventing the leakage of air between the pin and the control plug, sealing means for preventing the leakage of air between the control plug and the cylindrical member when the cylindrical member is located in the cylindrical recess, and an air passage extending from the surface of the pin adjacent the cylindrical member through the pin to the other end of the pin, so that when the cylindrical member is spaced from the control plug the conduit means will be in communication with the atmosphere outside the valve block body but that when the cylindrical member is located within the recess the conduit means can be pressurized.

7 Claims, 8 Drawing Sheets

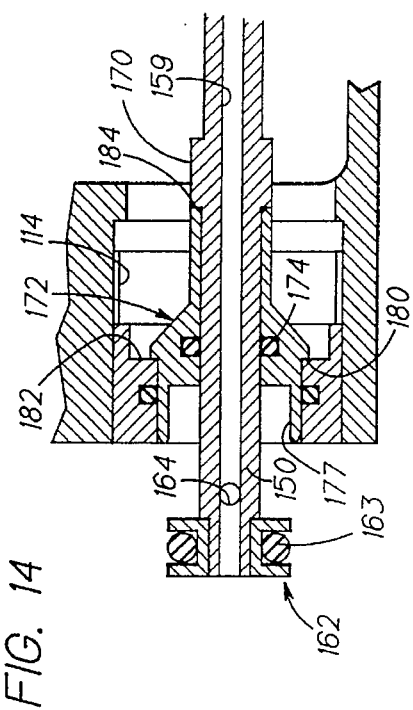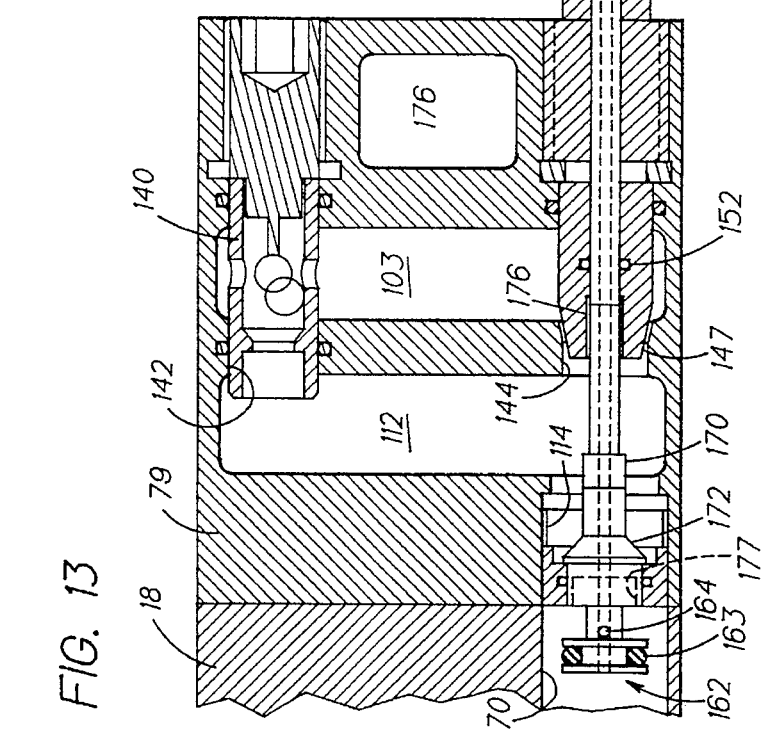

VALVE BLOCK ASSEMBLY FOR I.S. MACHINE

The present invention relates to I.S. (individual section) machines which make glass containers from molten gobs of glass. The invention is a CIP of Ser. No. 08/047,680 filed Apr. 15, 1993, now abandoned.

Each individual section of an I.S. machine has a blank side which forms a parison from the gob in a blank side mold and a blow side which forms the final glass container from the parison in a blow side mold. A number of movable mechanisms such as a blank side mold opening and closing mechanism, a plunger mechanism to be moved into a gob contained within the blank side mold, an invert mechanism for taking the formed parison and carrying it to the blow side, a blow side mold opening and closing mechanism, a takeout for removing the formed glass container from the blow side and depositing it on a dead plate and a pusher which will displace a bottle from the dead plate onto a conveyor are associated with each section and these mechanisms require air having a variety of pressures.

To control the application of this air, each section has a valve block which supports a number of on/off valves which are operated by electronically controlled solenoids. A prior art valve block is shown in U.S. Pat. Nos. 3,918,489 and 4,382,451.

It is an object of the present invention to provide an improved valve block for a section of an I.S. machine.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 2 is a front view of the valve block manifold;

FIG. 3 is a view taken at 3—3 of FIG. 2;

FIG. 4 is a view taken at 4—4 of FIG. 2;

FIG. 5 is a view taken at 5—5 of FIG. 2;

FIG. 13 is a cross-sectional view through the valve block body showing one of the parallel flow paths controlled with a meter in valve and a needle valve;

FIG. 14 is an enlarged view of a portion of FIG. 13;

Figure 1:
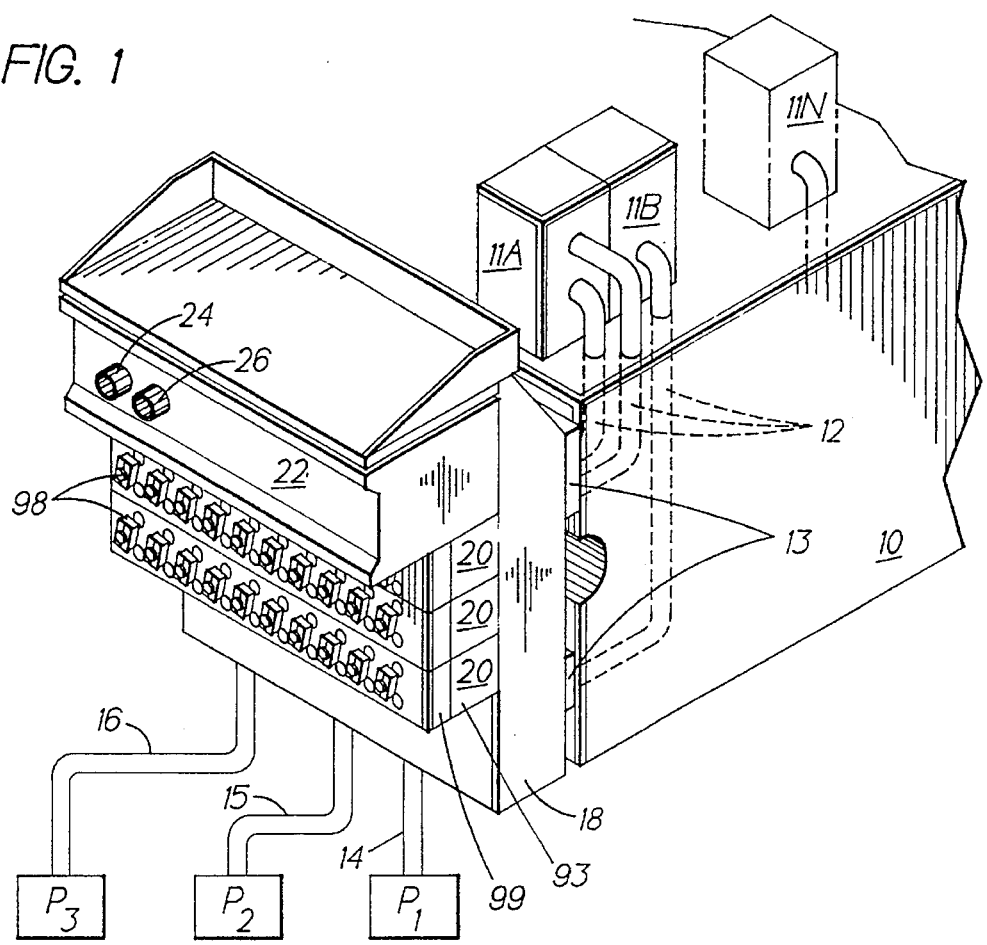
FIG. 1 is a schematic illustration of the valve block assembly made in accordance with the teachings of the present invention connected to an individual section of an I.S. machine.

FIG. 1 is a schematic showing of a portion of one of the plurality (6,8,10,12, for example) of sections of an I.S. machine. The section frame 10 supports a number of air operated mechanisms 11A, 11B . . . 11N such as an invert, takeout, mold opening and closing mechanism, etc. which have to be repeatedly displaced. U.S. Pat. No. 4,362,544 describes in detail these mechanisms. The air lines 12 for these mechanisms are connected to one or more "KISS" plates 13. High pressure P1, low pressure P2 and pilot air P3 are supplied through pipes 14, 15, 16 to a manifold 18 and from the manifold to the valve blocks 20. This high and low pressure air is selectively redirected back to the manifold where it is directed through passages in the manifold to associated passages in the kiss plates and into the frame conduits 12. As shown, one mechanism 11A has two air lines and could, for example, include a three way valve, whereas mechanism 11B has only one air line and could, for example, include a pilot operated valve with either low pressure or high pressure air serving as this pilot air. A console 22 is located above the valve blocks and houses the electronics for controlling the solenoid valves. A machine stop button 24 and associated machine stop light 26 may be located on the front of the console.

FIG. 2 is a front view of the manifold showing the surface on which the valve blocks are to be mounted. As can be seen, there are three horizontal rows of ten exit apertures 30 each having upper 31 and lower 32 semi circular segments separated by a divider 33. The upper exit apertures 31 of each row communicate with a horizontally extending internal chamber 34 which is supplied with high pressure air. FIG. 3 shows how high pressure air is fed through an opening 35 in the base 36 into a vertically extending channel 37 which communicates with these high pressure chambers 34.

The lower exit apertures 32 of the upper two rows communicate with horizontally extending internal chambers 38 which are supplied with low pressure air. FIG. 3 also shows how low pressure air is fed through a base opening 39 into a vertically extending channel 40 which communicates with these low pressure chambers 38. This vertical low pressure channel 40 also communicates with a horizontally extending chamber 42 which communicates with the two low pressure exit apertures on the right hand end of the lowermost row. A separate chamber 44 communicates with the lower exit apertures of the two left hand apertures in the lowermost row and this chamber also is in communication with the low pressure vertical channel 40.

Referring to FIGS. 2 and 4, the lower exit aperture of each of the central six apertures of the lowermost row communicates with its own vertical channel 50. These channels have a normally open opening 51 at the bottom and a pair of aligned holes 52, 53 in the front 54 and rear 55 channel walls. By plugging 56 both aligned holes of these six vertical channels and by connecting these channels through the opening 51 at the bottom to an independent pressure source, these channels can be connected to a pressure source having a pressure other than high and low pressure. These inlets 51 can accordingly be connected to a unique pressure such as plunger up pressure P4 or counterblow pressure P5. In the illustrated embodiment which is to control a triple gob machine, six special conduits are provided for the three plunger up lines and the three counterblow lines. Should special pressures not be required, the bottom holes 51 to these six (or any of them) can be plugged and the plugs in the rear walls 55 can be removed (access by removing the plug in the front wall) so that low pressure air from a chamber 58 which is located behind these channels 50 and which communicates with the low pressure vertical channel 40, will enter these individual chambers 50 to supply the lower apertures with low pressure air. Pilot air (P3) is supplied to the valve blocks through piping 60 having an exit port 62 for each block and exhaust air exhausted from each block will be exhausted through a vertical exhaust channel 64.

For every exit aperture 30 in the manifold there is a conduit 70 (FIGS. 4 and 5) having an aperture 72 communicating with the front surface of the manifold and an aperture 74 communicating with one of the rear surfaces 13A, 13B of the manifold that will engage a kiss plate 13. The manifold (FIG. 2) also has an opening 76 at the bottom front left which will receive an electronic receptacle with the cable passing through a channel in the manifold up to the top chamber 78 so that the cable can be fed into the console through an opening at the rear of the console. Gaskets located between the mating surfaces of the kiss plates and the manifold and between the manifold and the valve blocks will effect the desired air tight seals.

Figure 6:
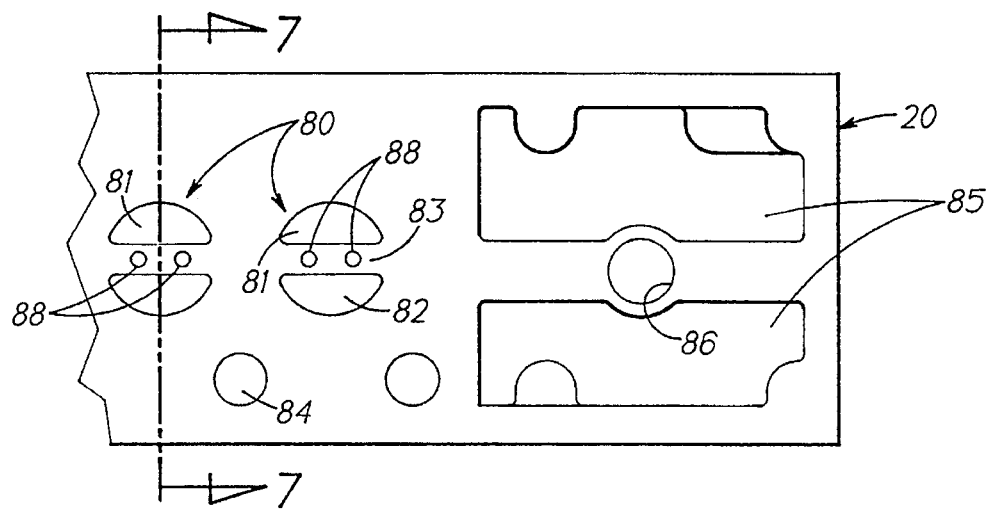
FIG. 6 is a rear view of a portion of one of the valve blocks which will engage the manifold.
Figure 7:
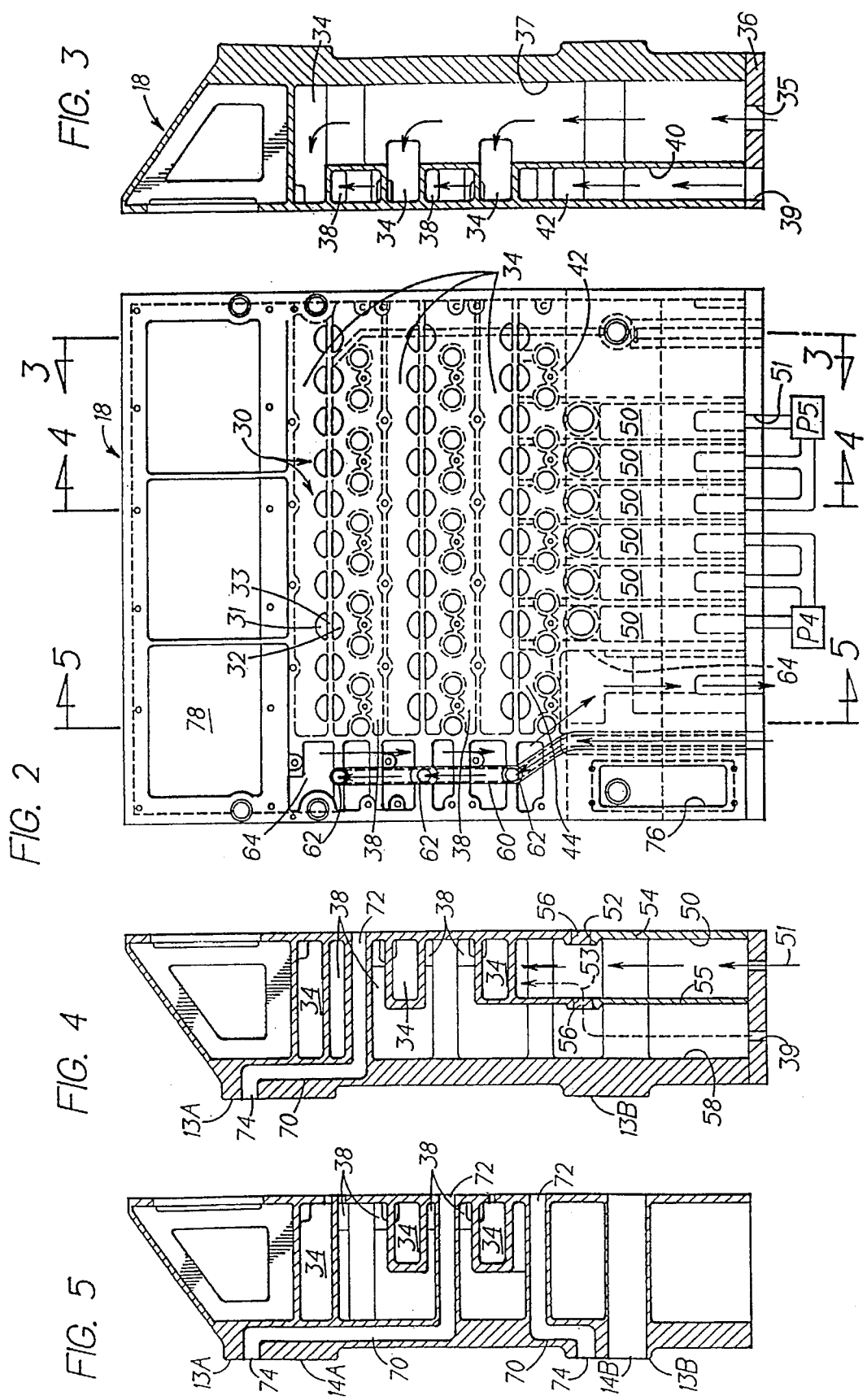
FIG. 7 is a view taken at 7—7 of FIG. 6.
Figure 8:
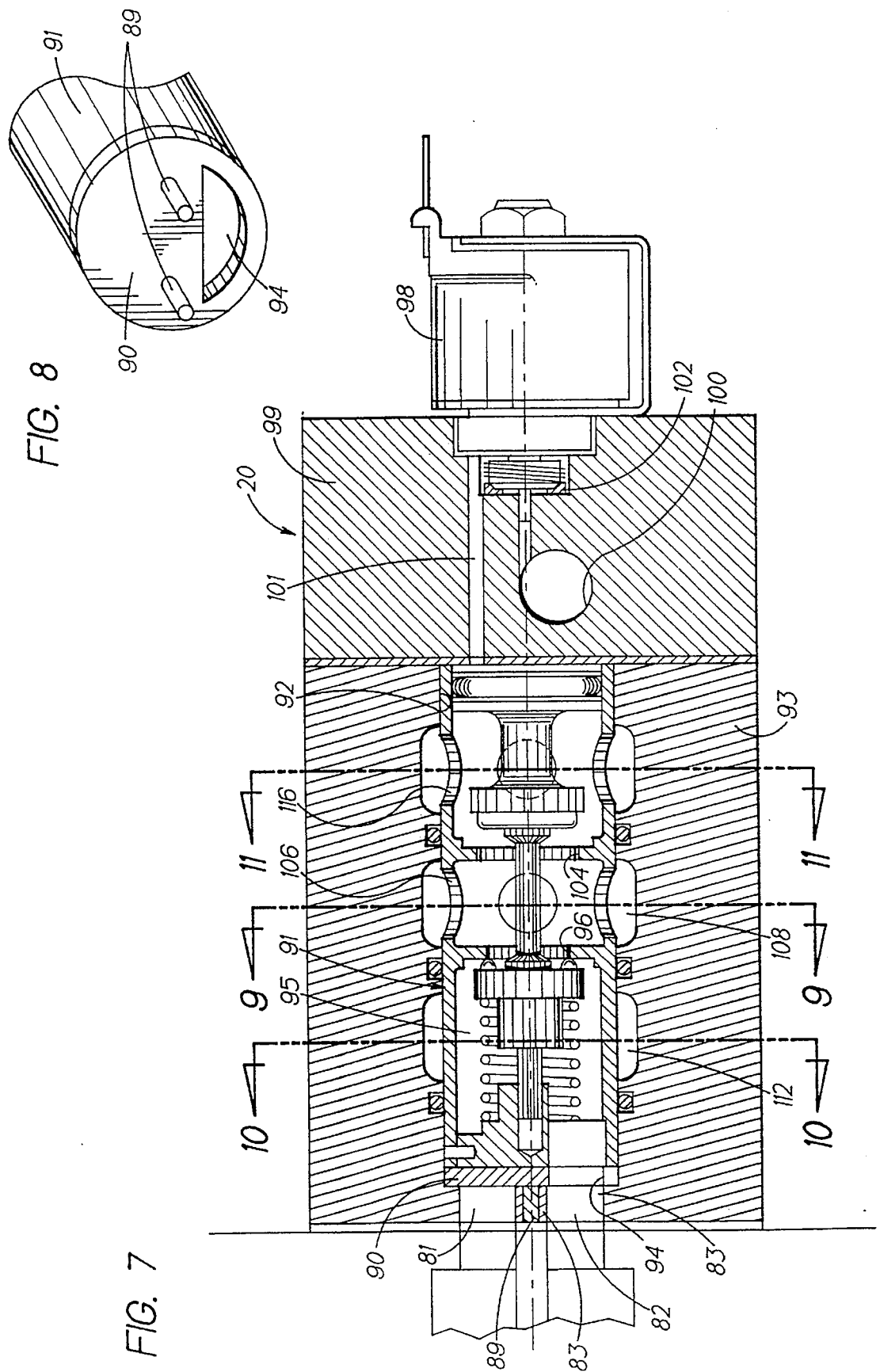
FIG. 8 is an oblique view of one end of a valve cartridge used in the valve block.
Figure 9:
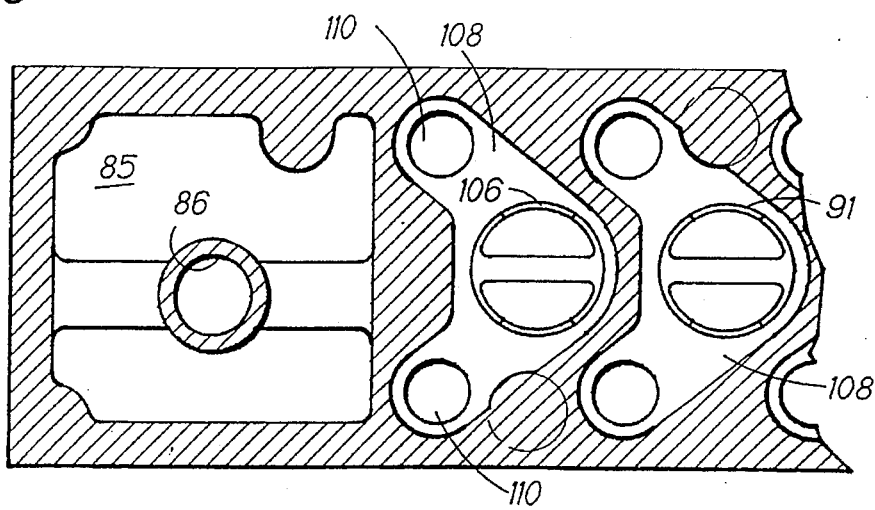
FIG. 9 is a view taken at 9—9 of FIG. 7.
Figure 10:
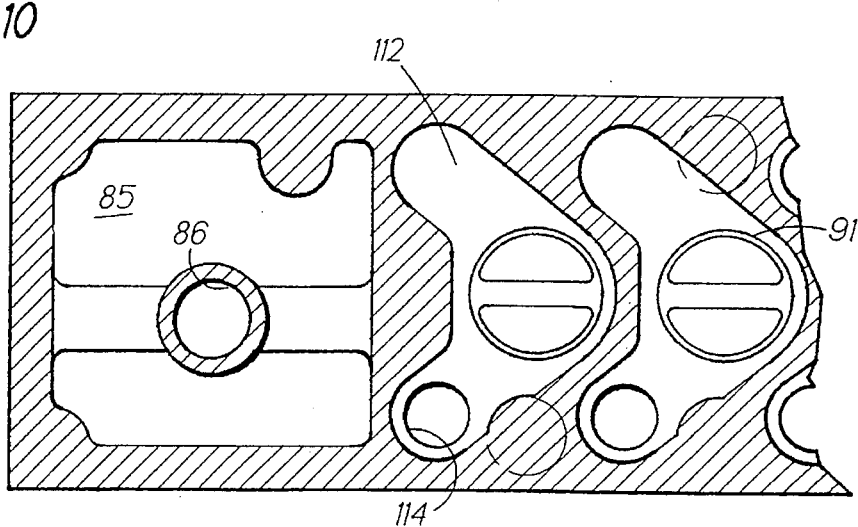
FIG. 10 is a view taken at 10—10 of FIG. 7.

Associated with each row of ten exit apertures 30 is a valve block 20 having corresponding inlet apertures. As can be seen from FIG. 6, which views a portion of the rear face of the valve block 20 which is to engage the manifold, each valve block includes inlet apertures 80 having upper 81 and lower 82 semi circular segments separated by a divider 83, an inlet exit aperture 84, an exhaust channel 85 and a pilot bore 86 which will communicate respectively with the matched exit apertures 30, inlet/exit aperture 72, pilot exit port 62 and exhaust channel 64 of the manifold. The divider has two through holes 88 which receive end pins 89 secured to the resilient end cap 90 of the cylindrical sleeve 91 of a cartridge valve (FIGS. 7 and 8). The sleeve is received by a suitable blind bore 92 in the valve block body 93 of a valve block 20. The valve sleeve 91 can be oriented with the inlet aperture 94, which is a circular segment matching a circular segment 81, 82 of the inlet aperture 80 of the block, either in communication with the low pressure inlet aperture 82 as shown or the cartridge can be rotated 180° with the pins 89 again inserted into the divider holes 88 to locate this inlet aperture 94 in communication with the high pressure inlet aperture 81. A chamber is accordingly defined including the aperture 94 in the end cap 90, the aligned hole 81 or 82 in the valve block and an internal cavity 95 in the sleeve 91. The cartridge valve will accordingly supply either high or low pressure air to a supply port 96 which is controlled by a solenoid 98 which is mounted on the solenoid mounting block portion 99 of the valve block. The solenoid mounting block portion clamps the cartridge valve within the blind bore 92 and hence, forces the resilient end cap 90 against the end of the blind bore to seal the operative inlet opening 81 or 82. The pilot air bore 86 extends through the valve block body and communicates with a pilot air line 100 in the solenoid mounting block portion which communicates with an air line 101 communicating with each cartridge valve via a solenoid 98 controlled seal 102. Should the illustrated pilot operated solenoids be replaced with solenoids not requiring pilot air, these pilot air lines could be eliminated. When the solenoid is off, the cartridge valve supply port 96 is closed and the cartridge valve exhaust port 104 is open. When the solenoid is operated the solenoid armature moves the seal to allow pilot air to operate the cartridge valve. When the solenoid is on, the valve element 105 is axially displaced from the illustrated position to its second position where the device port 104 is closed and the supply port 96 is open. Pressurized air then passes through the supply port 96 and through sleeve apertures 106 into a kidney shaped chamber 108 (see also FIG. 9) where it can flow through parallel conduits 110 into another kidney shaped chamber 112 (see FIG. 10) which surrounds the sleeve, leaving that chamber through a conduit 114 which is in communication with an associated manifold conduit 70. Optionally, the valve as used might be a normally open valve. Flow through these parallel conduits 110 can be controlled in a conventional manner with the use of full or half plugs and meter in or out check valves in one of these conduits and the selective use of a half plug or a needle valve, where required, in the other conduit.

Figure 11:
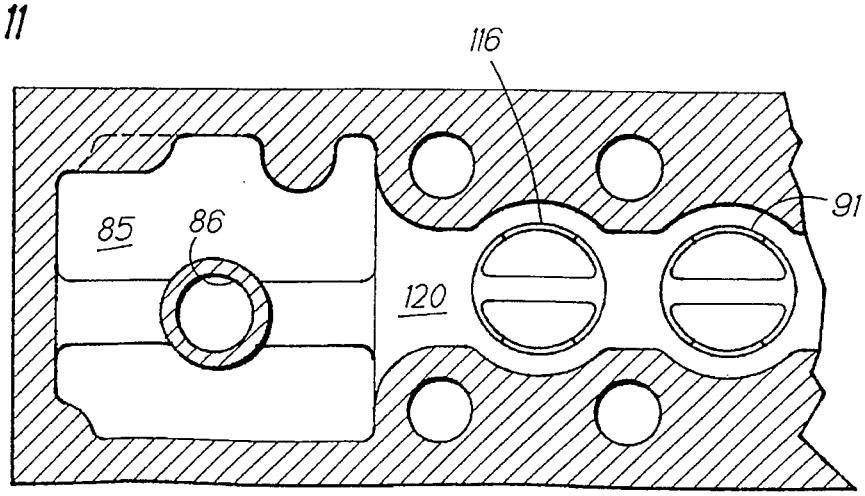
FIG. 11 is a view taken at 11—11 of FIG. 7.

When the solenoid is off exhaust air will proceed from the mechanism 11A, etc. through the manifold conduit 70, through the conduit 114 of the valve block into the first kidney shaped chamber 112, then through one or both of the parallel conduits 110 into the second kidney shaped chamber 108, through one set of sleeve holes 106 into the sleeve 91, through the exit port 104 of the cartridge valve, through a set of exit apertures 116 in the sleeve to a channel 120 (FIG. 11) which communicates with the exhaust channel 85.

Figure 12:
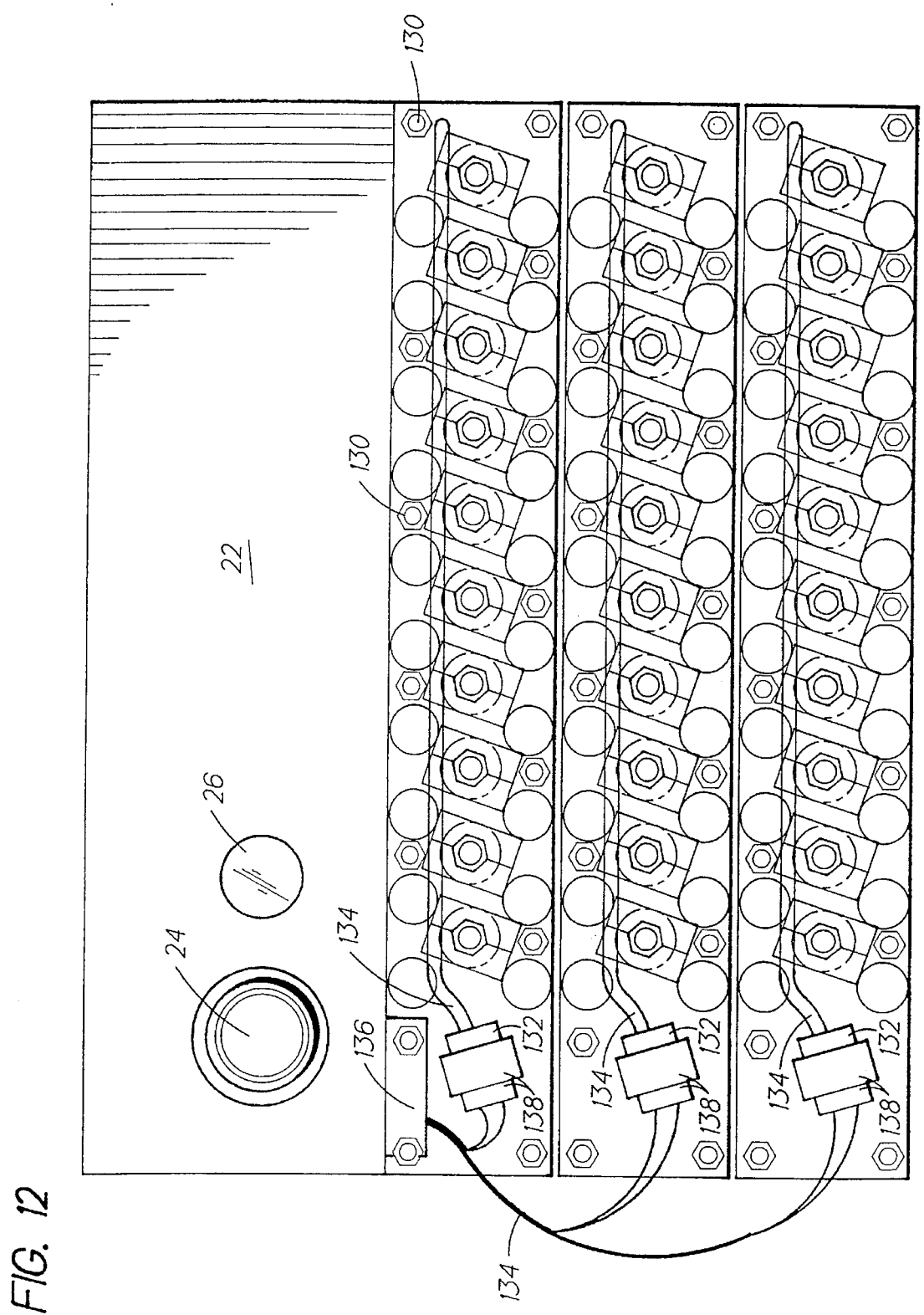
FIG. 12 is a front view of the electronics console and the valve blocks.

Referring to FIG. 12, each valve block can be quickly and easily replaced with an identically configured valve block in the event a failure occurs. Each valve block is secured to the manifold with bolts 130 so that mechanical separation is quick and simple. The solenoids for each block are wired from a receptacle 132 secured to the block wiring harness 134. Electrical connection to the console is effected with a single quick release coupling 136 which can be released from the console and the three individual couplings 138 can be quickly released from the three valve block receptacles 132. By removing the coupling 138 from the valve block to be removed and the console coupling 136 in the event the upper valve block is to be removed, any valve block can be removed (and replaced) quickly and simply.

To disable a valve, a lock out exhaust is provided. While this will be described with reference to a needle valve, it should be understood that it is equally applicable to other structures such as a half plug. FIG. 13 illustrates one of the parallel flow control paths through the valve block body 79 where a meter in check valve 140 is secured within the check path (conduit 142) and a needle valve 143 is secured within the needle path (conduit 144). The needle valve has a conventional body 146 having a conical tip 147 and a square end 148 so that a wrench or the like can engage and rotate the threaded needle valve to displace the conical tip 147 from the fully closed position to the doted fully open position.

Telescopically received within a stepped central bore 149 in the body 146, is a hollow slidably displaceable lock out pin 150 which is sealed by an O-ring 152. Secured to the exposed end of the lock out pin 150, is a knurled gripping knob 154 which has an annular groove 156. A hole 158 is drilled into the nut to communicate with the inner bore 159. Secured to the other end of the lock out pin 150, is a cylindrical member 162 which supports an O-ring 163. Another hole 164 is drilled through the lock out pin adjacent this cylindrical member to communicate with the inner bore 159.

As can be seen from FIG. 14, slidably located between the cylindrical member 162 and an annular flange 170 on the lock out pin, is a plug 172 which carries an O-ring 174 to seal the lock out pin. In the fully advanced lock out exhaust position illustrated in FIGS. 13 and 14, hole 164 communicates with conduit 70 thereby connecting this conduit to atmosphere via the inner bore 159 and knob through hole 158. To allow this needle valve to operate, the knob 154 is pulled. The cylindrical member 162 first engages the plug and when the flange 170 bottoms out in an annular groove 176 defined in the beveled needle end 147, the cylindrical member will become fully inserted in the cylindrical recess 177 of this plug. The exhaust path through hole 164 will accordingly be closed off. With the plug located within the kidney shaped chamber 112 the needle valve can function as intended.

The plug 172 has an annular flange 180 which will engage the annular ridge 182 at the end of the exit conduit 114 as the locking pin is advanced. Further advancement will push the cylindrical member 162 out of the plug recess and to a final position defined by the engagement of the flange 170 with the end surface 184 of the plug 172. A set screw 186 is located within a surface groove 188 which has a circumferential segment 190 so that at the fully retracted position, the locking pin 143 can be rotated to locate the set screw 186 in this circumferential segment 190 to prevent axial displacement of the locking pin.

Figure 15:
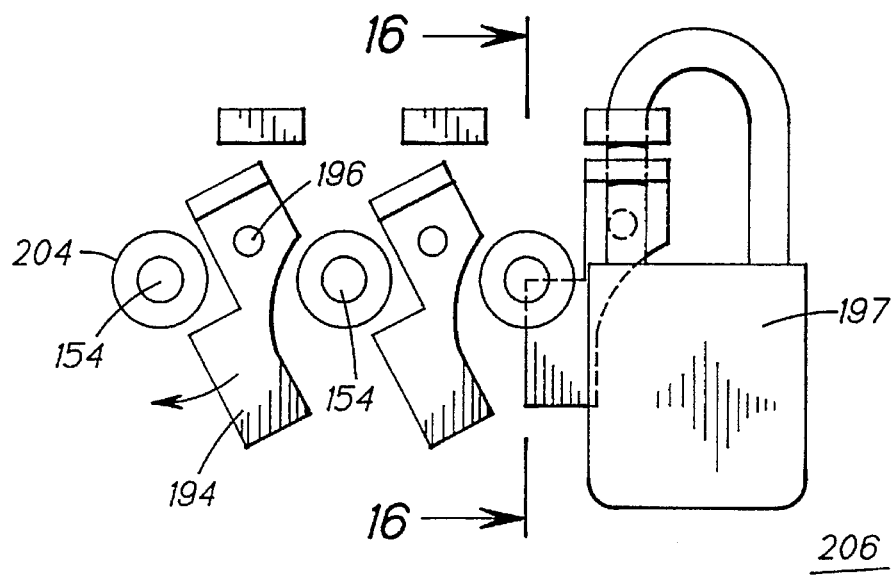
FIG. 15 is a front view of a lock out plate secured to the front of the valve blocks.
Figure 16:
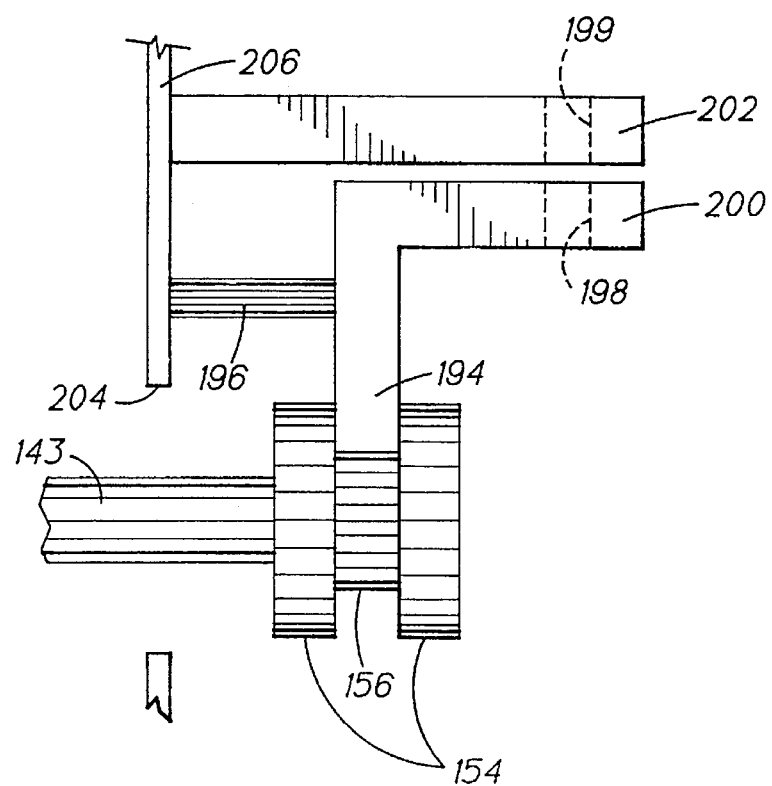
FIG. 16 is a view taken at 16—16 of FIG. 15.

When the lock out pin is fully advanced, a latch 194 which is pivotally supported on a shaft 196 can be rotated to locate the latch within the annular groove 156 of the knob 154 as illustrated in FIGS. 15 and 16. At this location, a lock 197 can be secured within aligned holes 198, 199 in the latch bracket 200 and in the permanent cantilevered locking bracket 202 to prevent movement of the latch to release the lock out pin. The needle valve 143 passes through suitable holes 204 in a cover plate 206 which supports these brackets.

Figure 17:
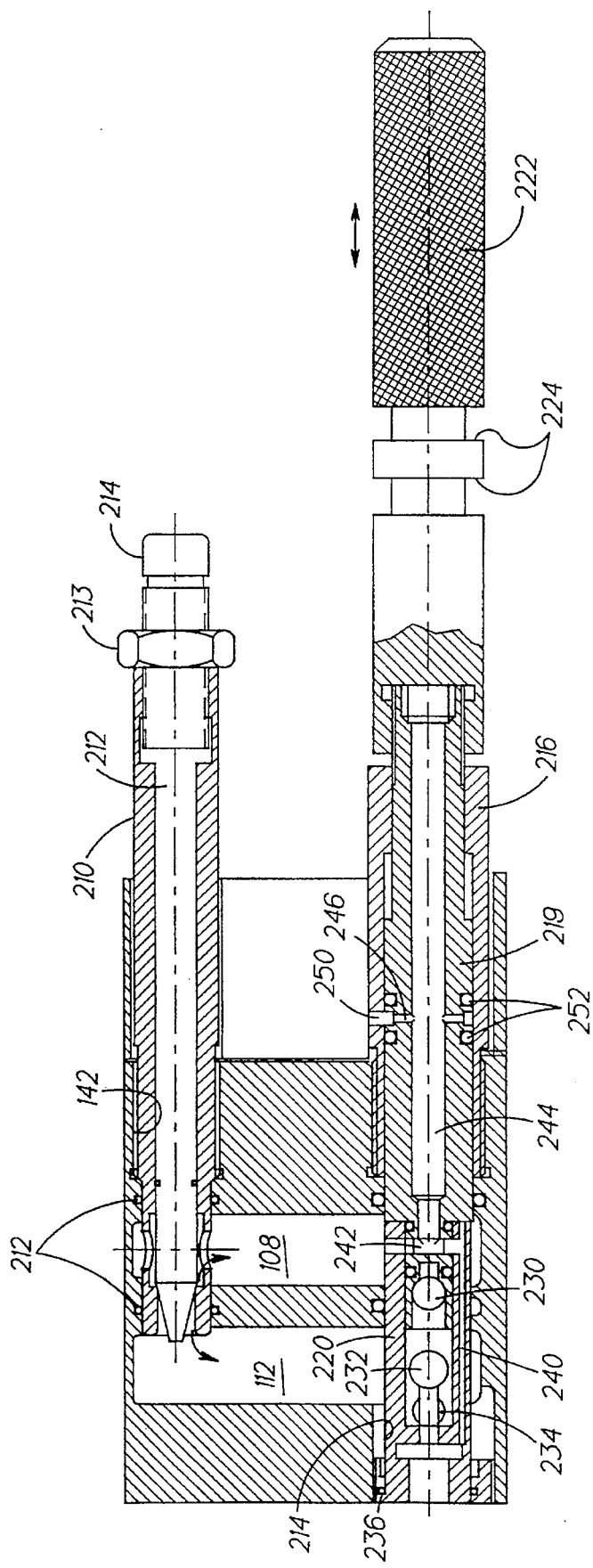
FIG. 17 is a view similar to FIG. 13 showing a second preferred embodiment.

As shown in FIG. 17, in the second embodiment a standard needle valve is used in cartridge form. It includes a sleeve 210 which is threadedly inserted into the upper valve body conduit 142. Sealing on either side of the kidney shaped chamber 108, in the form of O rings 212 is provided. The needle 312 is threaded into the sleeve 210 and throttles air between kidney shaped chambers 108 and 112. The needle can be locked in a desired position by tightening the lock nut 213. This is facilitated by the squared end 214 of the needle.

In this embodiment a conduit 314 extends through the valve body for threadedly receiving a second sleeve 216 which forms the support member for a two piece sliding member 218 which is made up of a body 219 and a sleeve 220. A knurled handle 222 is screwed onto the end of the body 219 and includes two locking grooves 224 which allow the valve to be locked either in or out.

In the locked position shown, air from the cartridge valve can flow between chambers 108 and 112 through the needle valve. It can also flow from chamber 108 into port 230 in sleeve 220, unseat the check ball 232 of a meter-out check valve and flow into chamber 112 through port 234 in the sleeve. Air cannot flow into the outlet port since the plug end of the sleeve is inserted into an O ring seal 236 in the seat. At the same time, air in the mechanism piping passes into the left hand end of the sleeve 220 and through a hole 240 to a cross drilled hole 242. The flow then continues through passage 244 and cross drilled hole 246 in body 219 and out hole 250 in sleeve 216 to atmosphere.

When the handle is unlocked, shifted to the right and relocked, air can pass freely between chamber 112 and the mechanism conduit 70 because the plug end of sleeve 220 is disengaged from the O ring seal 236. Flow is also prevented from cross passage 246 to passage 250 by a pair of O rings 252 which define a seal between sleeve 216 and body 219. While a meter-out check valve is shown, the valve could also be a meter-in check valve or it could be a valve having no check valve function.

I claim:

1. A valve block assembly for supplying air under pressure to an air operated mechanism of a glass container manufacturing machine comprising a manifold including a conduit, a valve block body, conduit means defined in said valve block body communicating with said manifold conduit, a valve displaceable from an open to a closed position for controlling the flow of air between said manifold conduit and said valve block body conduit means including a cylindrical control plug having an axial bore and a cylindrical recess, means for supporting said pin for within said axial bore, one end of said pin being located outside of said block, a cylindrical member coaxially secured to the other end of said pin and selectively sized for insertion into said recess, sealing means for preventing the leakage of air between said control plug and said cylindrical member when said cylindrical member is located in said cylindrical recess, and an air passage extending from the surface of said pin adjacent said cylindrical member through said pin to the other end of said pin outside of said valve block body, so that when said cylindrical member is spaced from said control plug said conduit means will be in communication with the atmosphere outside said valve block body but that when said cylindrical member is located within said recess the pressure of said conduit means can be controlled by displacing said valve between the closed and open positions.

2. A valve block assembly according to claim 1, further comprising means for stopping the forward displacement of said control plug at a selected location as said pin is displaced forwardly so that said cylindrical element can be removed from said cylindrical recess and displaced to a position spaced from said control plug.

3. A valve block assembly according to claim 2, further comprising means for stopping the rearward displacement of said control plug so that said cylindrical member can be fully pulled into said cylindrical recess.

4. A valve block assembly according to claim 2, further comprising a knob on said other end of said pin having an annular coaxial groove therein and a latch element pivotally mounted for displacement from a remote position to an advanced position whereat said latch element will be located within said annular groove when said pin is located at said position where said cylindrical member is spaced from said control plug.

5. A valve block assembly according to claim 4, further comprising means for locking said latch at said advanced position.

6. A valve block assembly according to claim 1, wherein said supporting means comprises a needle valve.

7. A valve block assembly according to claim 1, wherein said manifold comprises a plurality of conduits, said valve block body comprises a corresponding plurality of said conduit means communicating with said plurality of manifold conduits and further comprising a corresponding plurality of said valves supported for axial displacement in said plurality of valve block conduit means.

* * * * *